US012775471B1

(12) United States Patent
Lu et al.

(10) Patent No.: US 12,775,471 B1
(45) Date of Patent: Oct. 27, 2026

(54) DYNAMIC CONFIGURATION MANAGEMENT

(71) Applicant: Zoom Communications, Inc., San Jose, CA (US)

(72) Inventors: Liang Lu, Hangzhou (CN); Qing Wang, Hangzhou (CN); Chao Zeng, Hangzhou (CN); Yufan Zeng, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 153 days.

(21) Appl. No.: 18/505,179

(22) Filed: Nov. 9, 2023

(51) Int. Cl.
*G06F 9/445* (2018.01)
*H04L 65/403* (2022.01)
*H04N 7/15* (2006.01)

(52) U.S. Cl.
CPC ........ *G06F 9/44505* (2013.01); *H04L 65/403* (2013.01); *H04N 7/15* (2013.01)

(58) Field of Classification Search
CPC ...... G06F 9/44505; H04L 65/403; H04N 7/01
See application file for complete search history.

(56) References Cited

U.S. PATENT DOCUMENTS 11,080,065 B1 * 8/2021 Reshadi ................ H04L 67/564
11,233,700 B2 * 1/2022 Devireddy .......... H04L 41/0816
2006/0190575 A1 * 8/2006 Harvey ................. H04L 67/303 709/222
2007/0268515 A1 * 11/2007 Freund .................... H04L 67/34 358/1.15
2007/0268516 A1 * 11/2007 Bugwadia ........... H04L 41/0886 358/1.15
2013/0091344 A1 * 4/2013 Doren ................ G06F 9/44505 707/821
2020/0119979 A1 * 4/2020 Woodland ............. H04L 41/082
2023/0318958 A1 * 10/2023 Mehta ..................... H04L 43/04 709/224

FOREIGN PATENT DOCUMENTS

| | | | |
|---|---|---|---|
| CN | 111562950 | A | 8/2020 |
| CN | 111984310 | A | 11/2020 |
| CN | 112187934 | A | 1/2021 |
| CN | 113612681 | A | 11/2021 |
| CN | 114327604 | A | 4/2022 |
| CN | 114564251 | A | 5/2022 |
| CN | 115268929 | A | 11/2022 |
| CN | 115271819 | A | 11/2022 |
| CN | 115348311 | A | 11/2022 |
| CN | 115587827 | A | 1/2023 |
| CN | 115794416 | B | 4/2023 |
| CN | 116245627 | A | 6/2023 |

* cited by examiner

*Primary Examiner* — Nimesh G Patel
(74) *Attorney, Agent, or Firm* — Young Basile Hanlon & MacFarlane, P.C.

(57) ABSTRACT

Configuration settings are dynamically distributed from a server to one or more data centers serving cloud-native applications. The server sends a first set of configuration settings to a data center in response to an initialization of an application at the data center. Subsequently, the server sends second sets of configuration settings to the data center, each second set including only new, modified, or deleted configuration settings. The second sets are sent either at predetermined intervals or in response to a request message from a data center. Configuration settings may be compressed prior to sending and/or storing.

20 Claims, 9 Drawing Sheets

DYNAMIC CONFIGURATION MANAGEMENT

FIELD

This disclosure generally relates to video conferencing, and, more specifically, to communication and management of configuration settings between a configuration server and an application server.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
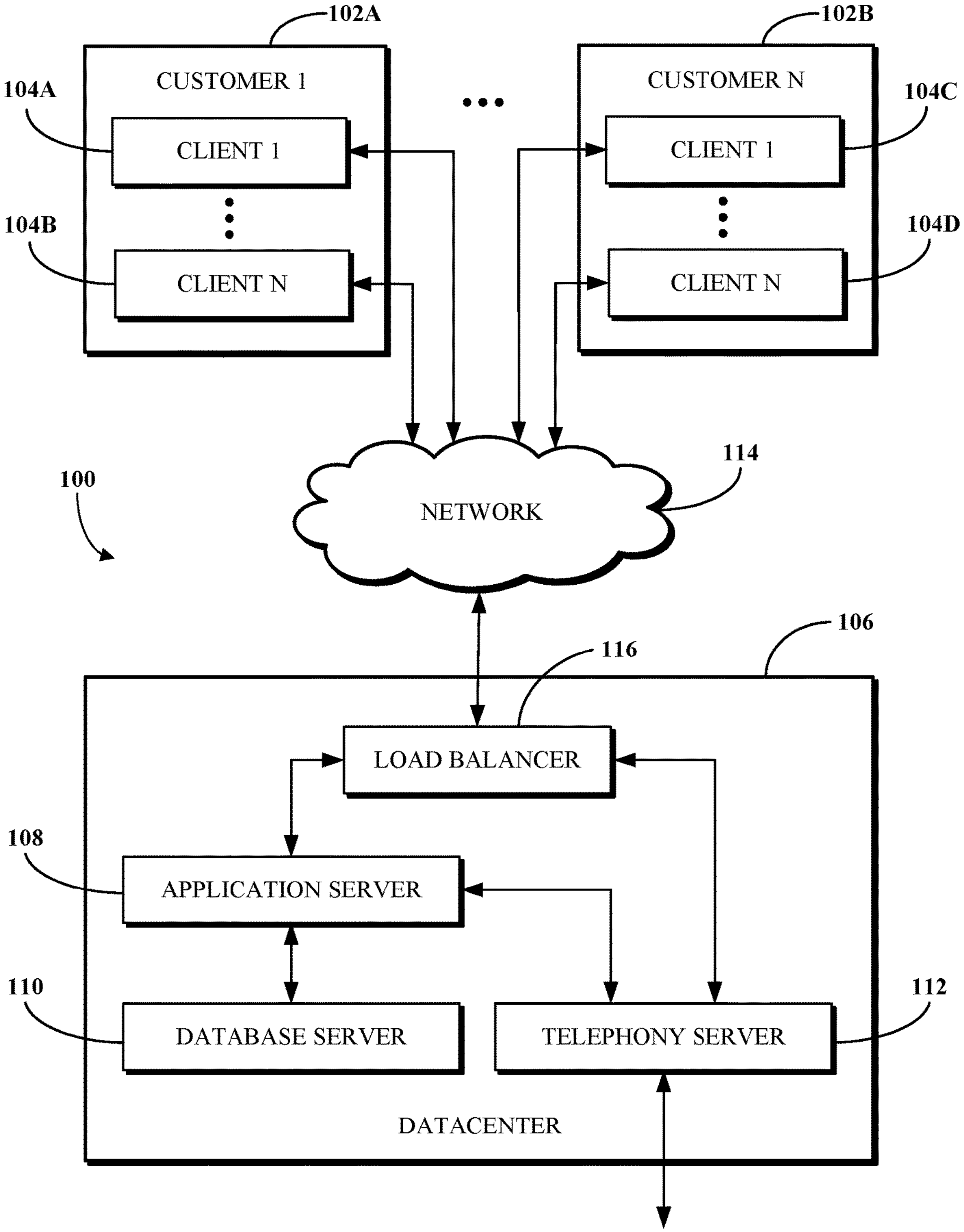
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in a conference room or similar physical space (e.g., in an office setting) and connect to the conferencing software therefrom while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conferencing software may be stored and/or executed (i.e., as executable instructions) at a data center comprising one or more servers, e.g., a database server and an application server. Conferencing software may utilize configuration settings that govern functionalities (e.g., features) of the video-enabled conferencing that is available to conference participants. Configuration settings may be stored at one or more locations for convenient access by the conferencing software. For example, it may be beneficial to store a master configuration file on a configuration server that is remote to the data center and a local copy of the master configuration file within the data center, e.g., on the database server or the application server. Remote storage of a master configuration file can be particularly beneficial when there are many application servers, associated with many data centers, each executing conferencing software that accesses configuration settings of a common (master) configuration file. For example, data centers and/or application servers may be located in certain geographic regions to serve conference participants in those regions. The master configuration file may be distributed to the plurality of application servers from time to time.

Dynamic Naming and Configuration Service (Nacos) is a discovery, configuration, and service management platform for building cloud-native applications such as some video conferencing applications, and is an example of a configuration service that can be used to distribute configuration settings from a server to one or more clients. A Nacos client (e.g., an application server such as a web server that implements or participates in implementing a video conferencing service) can receive a modified configuration for a cloud-native application via a Nacos configuration file. For example, Nacos may be used for distributing a configuration file or configuration settings to a plurality of application servers (e.g., web servers). A Nacos server (e.g., a configuration server) can push a master configuration file over a network, such as the Internet, to each of the application servers. Pushes may occur intermittently, e.g., at fixed intervals (periodically) or at irregular intervals (aperiodically), or in response to an event such as the addition, deletion, or other modification of one or more configuration settings within the master configuration file. Alternatively, each of the application servers can intermittently pull the master configuration file from the Nacos server.

A master configuration file may, for example, contain hundreds or thousands of configuration items. Each configuration item may include a value associated with a key, sometimes referred to as a key-value pair, where the "key" is a unique identifier of the configuration item and the "value" is the configuration setting for use by an application executing on an application server, such as a cloud-native application like some video conferencing applications. The value (of a key-value pair) may comprise a short configuration setting, like Boolean values TRUE or FALSE, or the value (of the key-value pair) may comprise a long configuration setting, like a blacklist or a whitelist, that may include hundreds or thousands of elements (e.g., customer account identifiers or customer usernames). Consequently, some master configuration files can be large, e.g., requiring many megabytes or gigabytes of storage. Distributing a large master configuration file over a network, from the configuration server to one or more application servers, can be slow and burdensome on network resources.

After an application server receives a new master configuration file, the application server must determine what configuration settings in the master configuration file are new, deleted, or modified as compared to previously received or stored configuration settings. Specifically, the application server must execute its own computer code to analyze the master configuration file. Because the master configuration file may be large, this analysis can be slow and burdensome on computing resources.

Implementations of this disclosure address one or more of the limitations indicated above by enabling a reduction in the amount of network resources required to distribute configuration settings over a network from a configuration server, such as a Nacos server, to one or more application servers, such as Nacos clients. Implementations of this disclosure further enable a reduction in the amount of computing resources required for software executing on a given application server to determine new, deleted, or modified configuration settings (if any) of a received master configuration file. In particular, the Nacos server may send a first set of configuration settings, as a master (e.g., full, or complete) configuration file, to a data center in response to an initialization of an application at the data center. Subsequently, the Nacos server may send second sets of configuration settings, as partial configuration files, to the data center, where each partial configuration file includes only new, modified, or deleted configuration settings. The partial configuration files may be sent either at predetermined intervals or in response to a request message from a data center. Because the partial configuration file is typically smaller than the master configuration file, it requires fewer network resources to transmit via a network, and it requires fewer computing resources to process at the data center.

To describe some implementations in greater detail, reference is first made to examples of hardware and software structures used to implement a system for dynamic configuration management. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include one or more customers and/or clients, and it can include a configuration of customers or clients different from that generally illustrated in FIG. 1. For example, and without limitation, the system 100 can include hundreds or thousands of customers, and at least some of the customers can include or be associated with one or more clients.

The system 100 includes a datacenter 106, which may include one or more servers. The datacenter 106 can represent a geographic location, which can include a facility, where the one or more servers are located. The system 100 can include one or more datacenters and servers, and it can include a configuration of datacenters and servers different from that generally illustrated in FIG. 1. For example, and without limitation, the system 100 can include tens of datacenters, and at least some of the datacenters can include hundreds or thousands of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable quantity of each of the servers 108 through 112 can be implemented at the datacenter 106. The UCaaS platform can use a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed to deliver software services to a client, such as one of the clients 104A through 104D, as part of a software application. The application node can be implemented using processing threads, virtual machine instantiations, or other computing features of the application server 108. In some such implementations, the application server 108 can include a suitable quantity of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104A, the client 104B, the client 104C, the client 104D, or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired (e.g., electrical or optical), wireless (e.g., electromagnetic, optical), use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
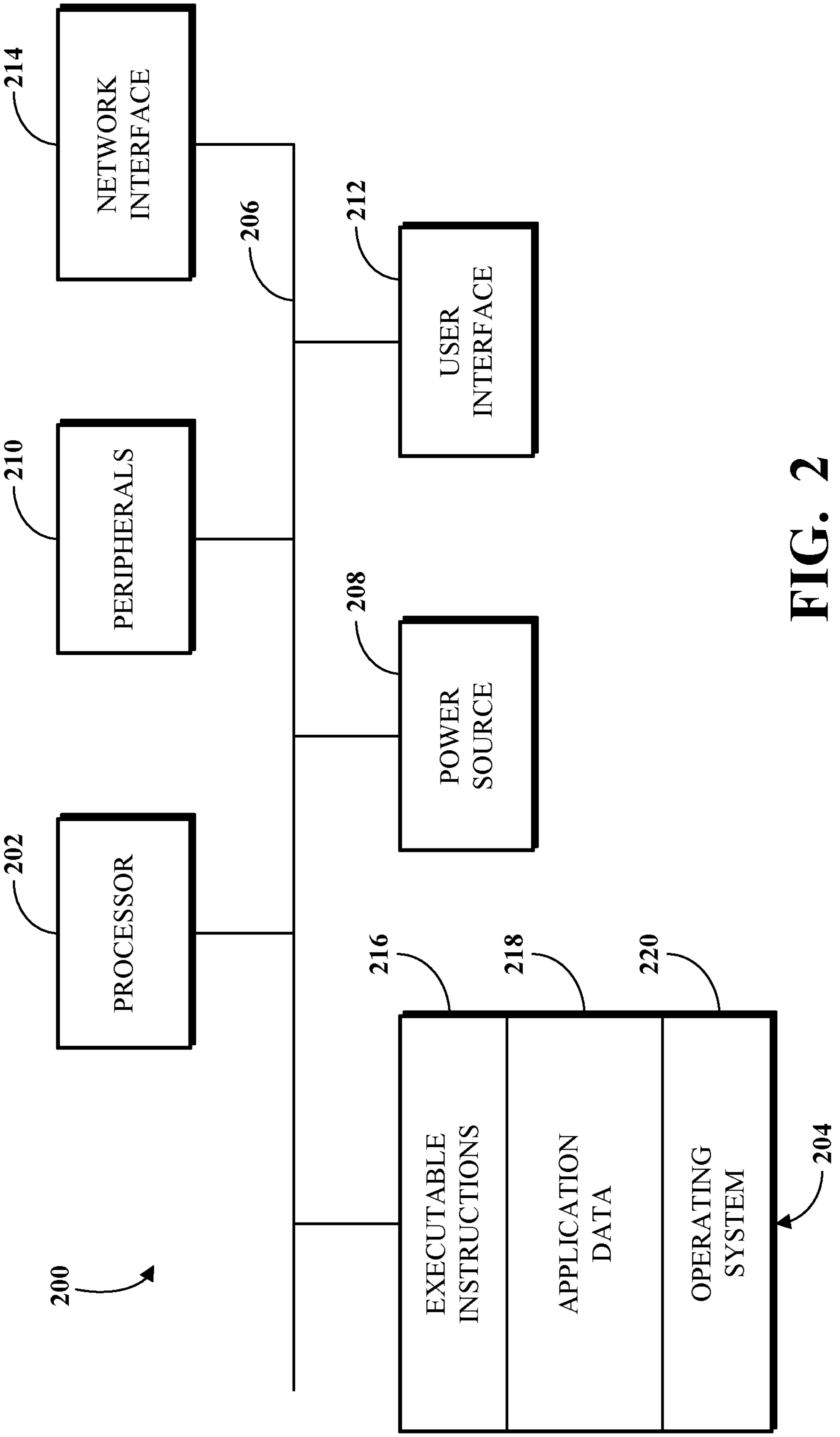
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104A, the client 104B, the client 104C, the client 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
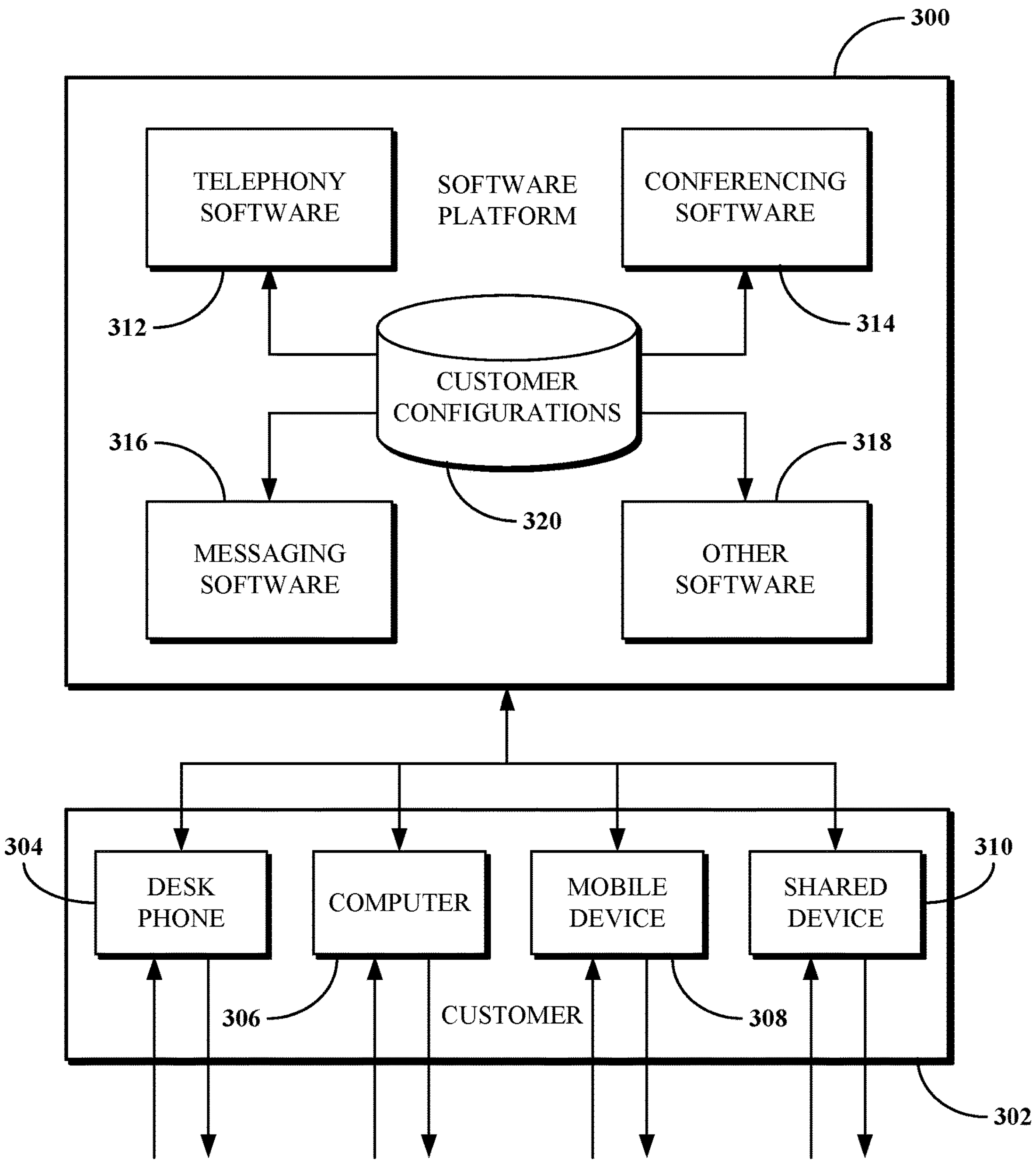
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients: a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the desk phone 304, the computer 306, the mobile device 308, and the shared device 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the desk phone 304, the computer 306, the mobile device 308, the shared sevice 310 and other telephony-enabled devices, which may be other ones of the desk phone304, the computer 306, the mobile device 308, the shared device 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which case the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software capable of analyzing a configuration file (such as a Nacos configuration file) or portions thereof, received from a configuration server (such as a Nacos configuration server) via a network, such as network 114 of FIG. 1.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the desk phone 304, the computer 306, the mobile device 308, and the shared device 310. Terms "run" and "execute" as used herein with reference to software may be synonymous.

Figure 4:
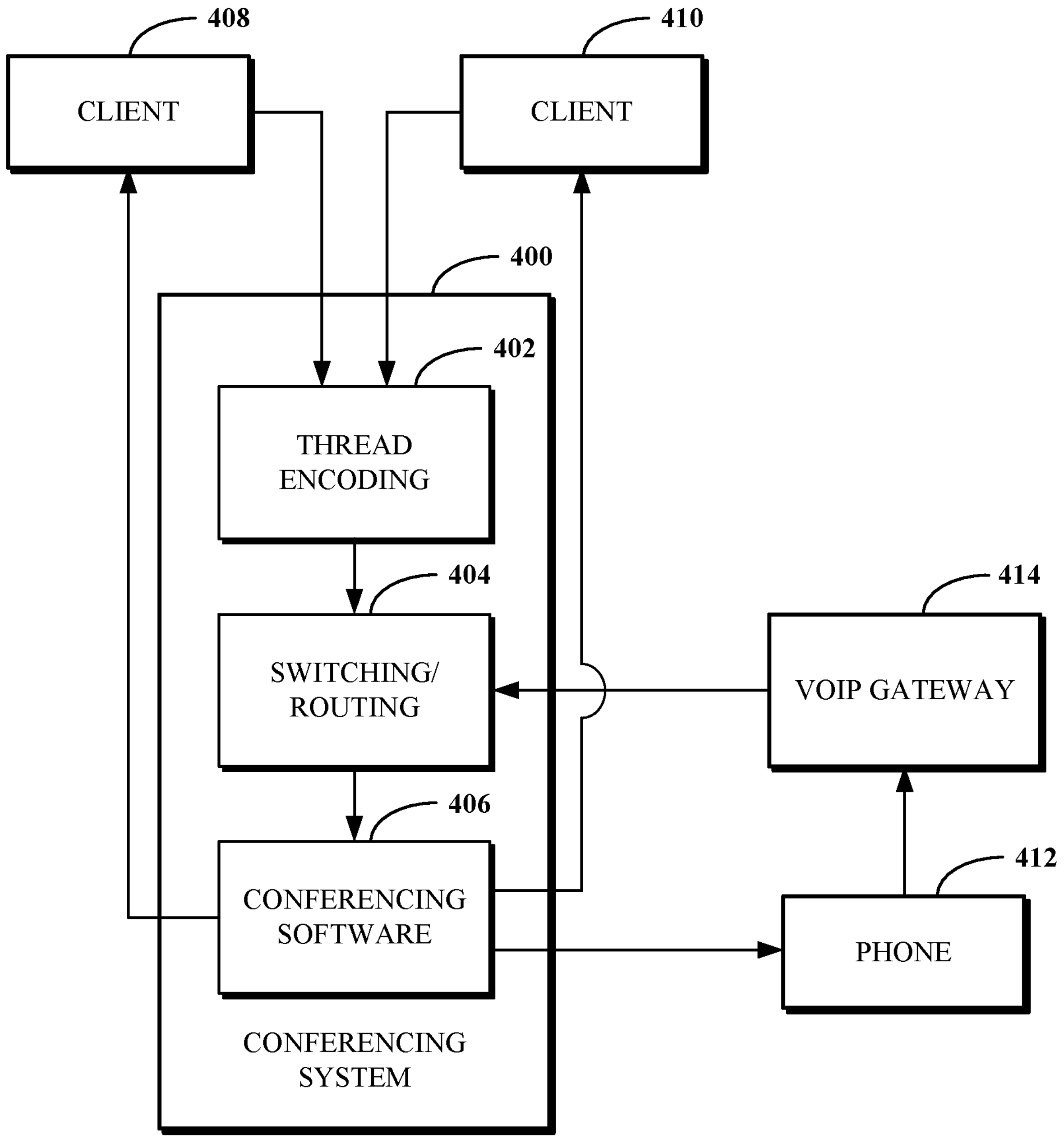
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may be, for example, the conferencing software 314 shown in FIG. 3, is software for implementing conferences (e.g., video conferences) between users of clients and/or phones, such as a client device 408, a client device 410, and phone 412. For example, the client device 408 or the client device 410 may each be one of the desk phone 304, the computer 306, the mobile device 308, or the shared device 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other quantities of clients and/or other quantities of phones can connect to the conferencing system 400.

Implementing a conference includes transmitting and receiving video, audio, and/or other data between clients and/or phones, as applicable, of the conference participants. Each of the client device 408, the client device 410, and the phone 412 may connect through the conferencing system 400 using separate input streams to enable users thereof to participate in a conference together using the conferencing software 406. The various channels used for establishing connections between the client devices 408 and 410 and the phone 412 may, for example, be based on the individual device capabilities of the client devices 408 and 410 and the phone 412.

The conferencing software 406 includes a user interface tile for each input stream received and processed at the conferencing system 400. A "user interface tile" as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and/or arranged in a center position of the conferencing software user interface while the user interface tiles for other conference participants are reduced in size and/or arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client device 408 or the client device 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant accesses the conferencing software 406 from a phone, such as the phone 412, the user interface tile for the participant may be limited to a static image showing text (e.g., a name, telephone number, or other identifier associated with the participant or the phone 412) or other default background aspects since there is no video stream presented for that participant.

The thread encoding tool 402 receives video streams separately from the client device 408 and the client device 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the client device 408 and the client device 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining via clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
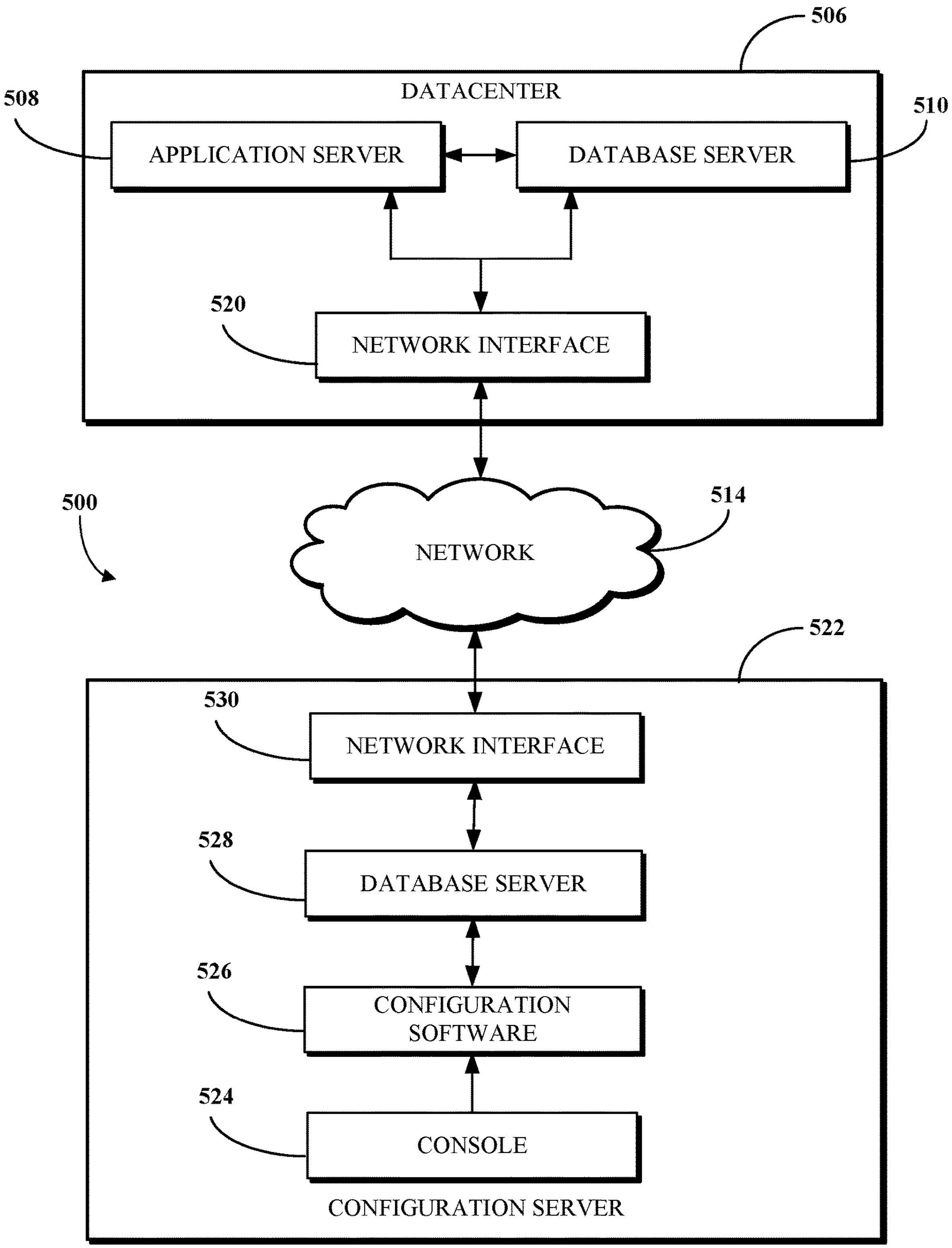
FIG. 5 is a block diagram of an example of a dynamic configuration management system associated with a conferencing system for delivering conferencing software services in an electronic computing and communications system.

FIG. 5 is a block diagram of an example of a dynamic configuration management system 500 that may be associated with a conferencing system, such as the conferencing system 400 of FIG. 4, for delivering conferencing software services in an electronic computing and communications system, for example, the system 100 shown in FIG. 1. The network 514 may be, for example, the network 114 of FIG. 1.

The configuration management system 500 includes a datacenter 506 (upper portion of FIG. 5) comprising an application server 508, a database server 510, and a network interface 520. The datacenter 506, application server 508, and database server 510 may be, for example, the datacenter 106, application server 108, and database server 110 of FIG. 1, respectively. The network interface 520 may be, for example, the network interface 214 of FIG. 2.

The configuration management system 500 further includes a configuration server 522 (lower portion of FIG. 5) comprising a console 524, a configuration software 526, a database server 528, and a network interface 530. The configuration server 522 may implement a Nacos configuration server. The console 524 and configuration software 526 may be implemented by, for example, the user interface 212 and the executable instructions 216 of FIG. 2, respectively, and the database server 528 may include the memory 204, comprising the application data 218, of FIG. 2. The network interface 530 may be, for example, the network interface 214 of FIG. 2. The console 524 provides a GUI for use by a user for creating modifying a Nacos master configuration file, where "modifying" may encompass adding, editing, or deleting configuration items of the master configuration file. The configuration software 526 carries out user-provided commands or instructions that may be input to the console 524 for creating or modifying the master configuration file. The database server 528 may be configured to store the master configuration file.

The network interface 520 and the network interface 530 each connect to a network 514 configured for routing messages between the datacenter 506 and the configuration server 522. A message may comprise a plurality of datagrams (e.g., packets, frames, etc.), each comprising a payload encapsulated by a header and/or a footer. The payload may comprise control and/or data information for use by the configuration management system 500; the header may comprise source and/or destination network routing information; and the footer may comprise error detection and/or correction information for the datagram. For example, the configuration server 522 may send the master configuration file to the datacenter 506 via the network 514. This may require the network interface 530 of the configuration server 522 to disassemble (e.g., divide or fragment) the master configuration file into a plurality of appropriately sized payloads for datagram encapsulation and transmission over the network 514. The network interface 520 of the datacenter 506 may subsequently receive the datagrams and reassemble the master configuration file from the plurality of payloads for further processing and/or storage at the datacenter 506.

Figure 6:
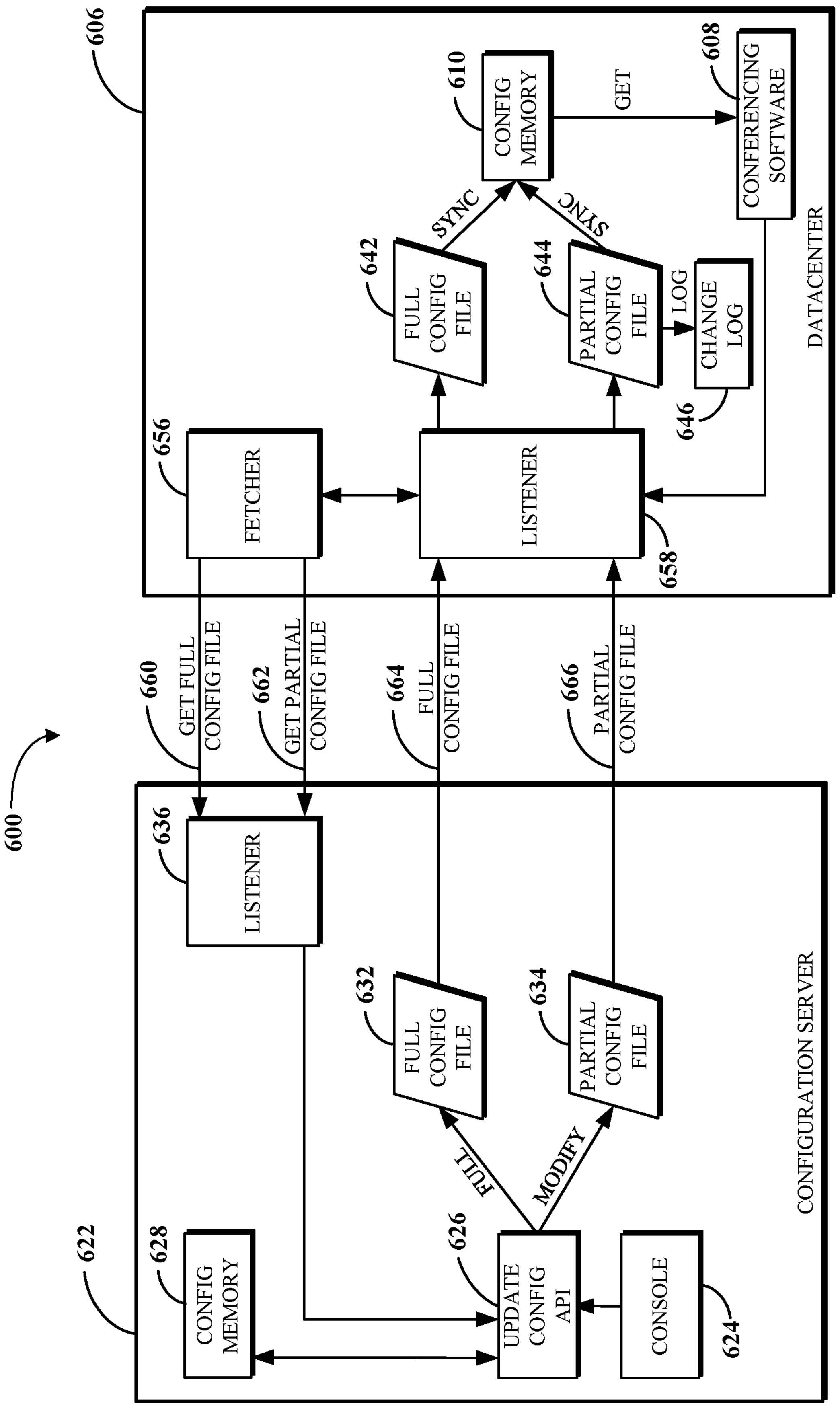
FIG. 6 is a diagram of an example of dynamic configuration management processing between a datacenter and a configuration server for delivering conferencing software services in an electronic computing and communications system.

FIG. 6 is a block diagram of an example of dynamic configuration management processing 600 between a datacenter 606 (on the right) and a configuration server 622 (on the left). The datacenter 606 and configuration server 622 may be, for example, the datacenter 506 and the configuration server 522 of FIG. 5, respectively. The configuration server 622 comprises a console 624, an update-configuration API 626 (API is an application-program interface) ("update config API"), a configuration memory 628 ("config memory"), one or both of a full configuration file 632 (full config file") and a partial configuration file 634 ("partial config file"), and a listener 636. The console 624 and configuration memory 628 may be implemented by, for example, the console 524 and database server 528 of FIG. 5, respectively; and the update-configuration application programming interface API 626 and listener 636 may be implemented by, for example, one or more instances of the configuration software 526 FIG. 5. The datacenter 606 comprises a conferencing software 608, a configuration memory 610 ("config memory"), a full configuration file 642 ("full config file"), a partial configuration file 644 ("partial config file"), a change log 646, a fetcher 656, and a listener 658. The conferencing software 608, fetcher 656, and listener 658 may be executed on and/or implemented by, for example, the application server 508 of FIG. 5; and the config memory 610 and change log 646 may be implemented by, for example, the database server 510 of FIG. 5.

The console 624 is configured to receive user input for creating or modifying a master configuration file, such as a Nacos master configuration file, where "modifying" may include adding, editing, or deleting configuration items of the master configuration file. The update-configuration API 626 carries out user commands or instructions that are input to the console 624 for creating or modifying the master configuration file. As an example, a user may import, via the console 624, a new master configuration file, comprising a plurality of configuration items, for storage in the configuration memory 628 of the configuration server 622 and for subsequent distribution to the datacenter 606. In this case, the update-configuration API 626 stores the new master configuration file in the configuration memory 628, and further, creates a full configuration file 632 that is adapted for distribution to the datacenter 606. As another example, a user may modify an existing configuration item of the master configuration file, via the console 624, for storage in the configuration memory 628 of the configuration server 622 and for subsequent distribution to the datacenter 606. In this case, the update-configuration API 626 updates the existing configuration item of the master configuration file stored in the configuration memory 628, and further, creates a partial configuration file 634 that is adapted for distribution to the datacenter 606.

In some implementations, the master configuration file and the full configuration file 632 are identical. In other implementations, the master configuration file and the full configuration file 632 differ, where, for example, the full configuration file 632 is optimized or compressed for more efficient transmission over a network. Similarly, the partial configuration file 634 may be optimized or compressed for more efficient transmission over a network. Indeed, the master configuration file may also be compressed, for more efficient storage; however, the compression parameters, techniques, or algorithms used on the master configuration file may differ from those used on the full configuration file 632 or those used on the partial configuration file 634. Consequently, the data format of the master configuration file may differ from the data format of the first configuration file 632 and the data format of the partial configuration file 634. A configuration item that is compressed, i.e., in a compressed format, may comprise data of some fields that is compressed, such as the data of the value field (i.e., the value of the key-value pair of the configuration item), and it may comprise data of other fields that is not compressed, such as the data of the key field (i.e., the key of the key-value pair of the configuration item). Compression of some fields and not others may facilitate efficient processing and/or searching for configuration items in, for example, a full configuration file 632 or 642.

Communication between the configuration server 622 and the datacenter 606 may comprise pull communications, where the configuration server 622 sends information to the datacenter 606 in response to a request message having been received from the datacenter 606 requesting the information (i.e., "pulling" the information). Additionally or alternatively, communication between the configuration server 622 and the datacenter 606 may comprise push communications, where the configuration server 622 sends information to the datacenter 606 without having received a request message from the datacenter 606 requesting the information (i.e., "pushing" the information).

In a pull mode of obtaining information, for example, the fetcher 656 of the datacenter 606 may send a request message to the configuration server 622 to request that the configuration server 622 sends certain configuration items. The listener 636 of the configuration server 622 may listen for such request messages and respond by sending the certain configuration items to the datacenter 606. For example, the datacenter 606 may send a request message 660, "get full config file," indicating a request for the configuration server 622 to send to the datacenter 606 the full configuration file 632, e.g., to send all configuration items of a master configuration file, as a message 664, "full config file." The datacenter 606 may send the request message 660 ("get full config file") upon an initialization of an application executing on the datacenter 606, such as an initialization of a conferencing software 608. As another example, the datacenter 606 may send a request message 662, "get partial config file," indicating a request for the configuration server 622 to send to the datacenter 606 the partial configuration file 634, e.g., to send only configuration items of a master configuration file that have been recently modified (according to a predetermined measure of "recently" as described later herein), as a message 666, "partial config file." The datacenter 606 may send such a request message 662 ("get partial config file") upon a refresh of an application executing on the datacenter 606, such as a refresh of the conferencing software 608. A refresh may occur if the conferencing software 608 has not received a partial configuration file 634 within a predetermined duration, possibly indicating to the conferencing software 608 that a message containing a partial configuration file 634 may have been dropped or otherwise lost by a network conveying the partial configuration file 634, such as the network 514 of FIG. 5.

Determining which configuration items have been recently modified can be accomplished in several ways. As an example, the configuration server 622 may associate a timestamp with each configuration item of the master configuration file indicating when the respective configuration item was most recently modified or added to the master configuration file. Alternatively or additionally, the configuration server 622 may store a version number, of the master configuration file, that is incremented when a configuration item of the master configuration file is modified, added thereto, or deleted therefrom. The datacenter 606 can include in its request message 660 a time value or a version number. The time value can indicate to the configuration server 622 that any modifications to configuration items (including additions or deletions of configuration items) of the master configuration file having respective timestamps that are later than the received time value are to be considered as recently modified configuration items. The version number can indicate to the configuration server 622 that any modifications to configuration items (including additions or deletions of configuration items) of the master configuration file that occurred after the received version number are to be considered as recently modified configuration items. In some implementations, the configuration server 622 may maintain a table, an array, a cache, a list, or another suitable data structure that can be used to quickly identify configuration items that have been modified after a received time value or after a received version number.

In a push mode of obtaining information, for example, the listener 658 of the datacenter 606 may listen for unrequested messages sent from the configuration server 622. Push messages may be sent by the configuration server 622 periodically, e.g., at fixed intervals, or push messages may be sent by the configuration server 622 in response to a change in the master configuration file. As an example, the configuration server 622 may send the messages 666 ("partial config file") to the datacenter 606 comprising a partial configuration file 634 in response to a modification of a configuration item of the master configuration file by user input via the console 624. As another example, the configuration server 622 may send the messages 664 ("full config file") to the datacenter 606 comprising a full configuration file 632 in response to a creation of a new master configuration file by user input via the console 624. The listener 658 may be configured to listen for specific configuration items that are specified by the conferencing software 608. In other words, the listener 658 may be instructed by the conferencing software 608 to listen only for certain received configuration items, and to pass the values of those configuration items along to the conferencing software 608, while ignoring or not passing the values of other received configuration items along to the conferencing software 608.

The datacenter 606 stores configuration items included in a full configuration file 642, which is a received copy of the full configuration file 632, in the configuration memory 610. The full configuration file 642 may include many configuration items, perhaps thousands. Similarly, the datacenter 606 stores configuration items included in a partial configuration file 644, which is a received copy of the partial configuration file 634, in the configuration memory 610. The partial configuration file 644 may include one or more configuration items, but it typically includes fewer configuration items than the full configuration file 642. When receiving configuration items included in the partial configuration file 644, the datacenter 606 records information relating to the received configuration items in a change log 646, such as a unique identifier of each configuration item (e.g., a key as described later herein) and a timestamp associated with each configuration item. The datacenter 606 must synchronize, harmonize, or otherwise reconcile configuration items received from the configuration server 622 with configuration items already stored in its configuration memory 610, to ensure that the local copy of the master configuration file stored in the configuration memory 610 of the datacenter 606 is an accurate copy of the master configuration file stored in the configuration memory 628 of the configuration server 622 (e.g., as described later herein). Configuration items in the configuration memory 610 may comprise compressed data represented by a data-compression format.

Figure 7:
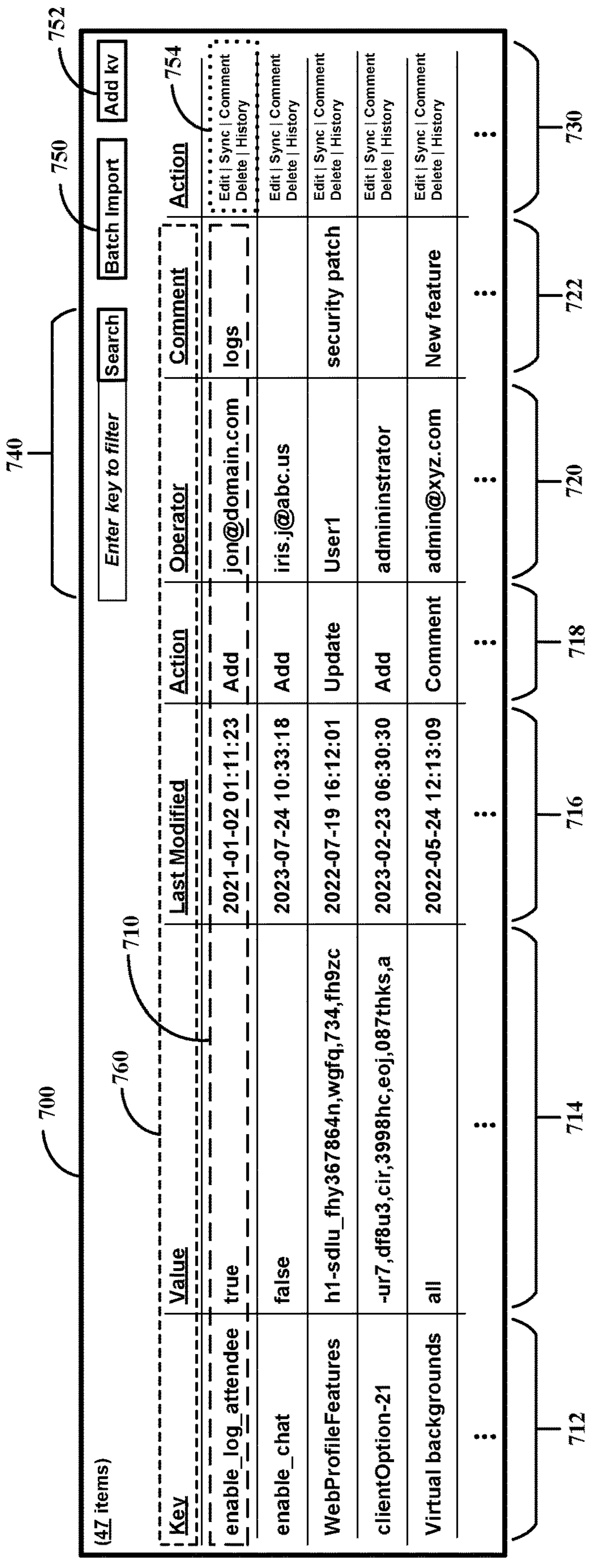
FIG. 7 is an example of a graphical user interface (GUI) for dynamically managing configuration settings associated with a conferencing system for delivering conferencing software services in an electronic computing and communications system.

FIG. 7 is an example of a GUI 700 that may be implemented by the console 624 of FIG. 6. The GUI 700 comprises a listing of individual configuration items 710 of a master configuration file, which may be stored in the configuration memory 628 of the configuration server 622 of FIG. 6. Each configuration item 710 comprises a plurality of fields, with a minimum of two fields: a key field 712 labeled as "Key" in a header row 760 and a value field 714 labeled as "Value" in the header row 760. The key field 712 and the value field 714 together comprise a key-value pair of a given configuration item 710. FIG. 7 shows several additional fields of the configuration item 710, including a timestamp field 716 labeled as "Last Modified," an action field 718 labeled as "Action," an operator field 720 labeled as "Operator," and a comment field 722 labeled as "Comment" in the header row 760. A configuration item 710 may comprise additional fields not shown in FIG. 7.

Configuration items included in the local copy of the master configuration file, which may be stored in the memory 610 of the datacenter 606 of FIG. 6, must each include at least a key-value pair. In some implementations, configuration items of the local copy of the master configuration file stored in the memory 610 of the datacenter 606 each include some or all of the additional fields included in the configuration items of the master configuration file stored in the config memory 628 of the configuration server 622. In some implementations, configuration items of the local copy of the master configuration file stored in the memory 610 of the datacenter 606 each include further additional fields not included in the configuration items of the master configuration file stored in the config memory 628 of the configuration server 622. For example, a configuration item of the local copy of the master configuration file stored in the memory 610 of the datacenter 606 may include (or otherwise be associated with) information identifying one or more applications, e.g., one or more instances of conferencing software 608, that have registered to listen for modifications to that configuration item.

The key field 712 contains a key of the configuration item 710, which is a unique identifier of the configuration item 710. The value field 714 contains a value of the configuration item 710, which may comprise any value suitable for use in configuring an application, such as an instance of the conferencing software 608 executing on the datacenter 606. The timestamp field 716 contains a timestamp, such as a date and a time, corresponding to when the configuration item 710 was last modified, added to, or deleted from the master configuration file. A timestamp may be stored in a suitable format, such as Universal Time Coordinated (UTC). The action field 718 contains an action associated with the timestamp contained in the timestamp field 716, for example, "Add" (e.g., "New"), "Update" (e.g., "Modify," "Edit," "Change," "Replace," etc.), and "Delete" (e.g., "Erase," "Remove"). In some implementations, it may be beneficial to retain deleted configuration items 710 in the master configuration file with an appropriate entry in the action field 718, for example, a "Deleted" entry, that marks the configuration item as deleted. In other implementations, it may be beneficial not to retain deleted configuration items 710 in the master configuration file, in which case, "Deleted" may not be a valid entry for the action field 718. The operator field 720 contains an identifier of an operator, e.g., a person, who performed the action indicated in the action field 718 for a given configuration item 710. The operator field 720 may contain a suitable identifier, for example, an email address, a username, a phone number, a person's legal name, a person's initials, and so on. The comment field 722 contains comments that may pertain to the configuration item 710.

The example GUI 700 further includes a search field 740 for use by a user (e.g., an operator) to filter configuration items of the master configuration file. The search field 740 may enable filtering by key, based on matching of characters entered in the search field 740 to characters in the key field 712 of each of the configuration items. In some implementations, the search field 740 may enable filtering according to one or more of the other fields, for example, by the value field 714, the timestamp field 716, the action field 718, the operator field 720, and the comment field 722.

The GUI 700 further includes functionality for a user to add, modify, or delete a configuration item; to view a history of a configuration item (e.g., when it was created, modified, and/or deleted); or to synchronize a configuration item. An import button 750 ("Batch Import") is shown in an upper right portion of the GUI 700 for use by a user to import, or add, a batch of configuration items from a file to the master configuration file. An add key-value button 752 ("Add kv") is also shown in an upper right portion of the GUI 700 for use by a user to manually add configuration items to the master configuration file, e.g., via a keyboard, one at a time.

The region 754 in the column 30comprises several user-selectable hypertexts, including "Edit," "Sync," "Comment," "Delete," and "History." Selecting the "Edit" hypertext in the region 754 enables the user to edit the contents of the fields of the respective configuration item 710. Selecting the "Sync" hypertext in the region 754 causes a synchronization of the respective configuration item 710 across a plurality of data centers and/or application servers, for example, across a cluster of the datacenters 506 and/or application servers 508 of FIG. 5, or across a cluster of the datacenters 606 of FIG. 6, such that all datacenters and/or application servers in the cluster will have stored an identical copy of the respective configuration item 710. This synchronization may be carried out by the update—configuration API 626 of FIG. 6 initiating a sending of a partial config file 634 that includes the configuration item 710 to all of the datacenters 606 in the cluster. Selecting the "Comment" hypertext in the region 754 enables the user to add to or edit the comment field 722 of the configuration item 710. Selecting the "Delete" hypertext in the region 754 enables the user to delete the configuration item 710. In some implementations, the configuration item 710 is deleted from the master configuration file (such that a search for the deleted configuration item 710 via the search field 740 will not return the deleted configuration item 710); in other implementations, the configuration item 710 is marked as "Deleted" in the action field 718, and optionally, the value field 714 of the configuration item 710 is deleted (such that a search for the marked-deleted configuration item 710 via the search field 740 will return the marked-deleted configuration item 710). Selecting the "History" hypertext in the region 754 enables the user to view historical events associated with the configuration item 710, for example, when it was added, modified, synchronized, and in some cases deleted, and to view an identifier of the operator who caused or was responsible for each historical event.

Figure 8:
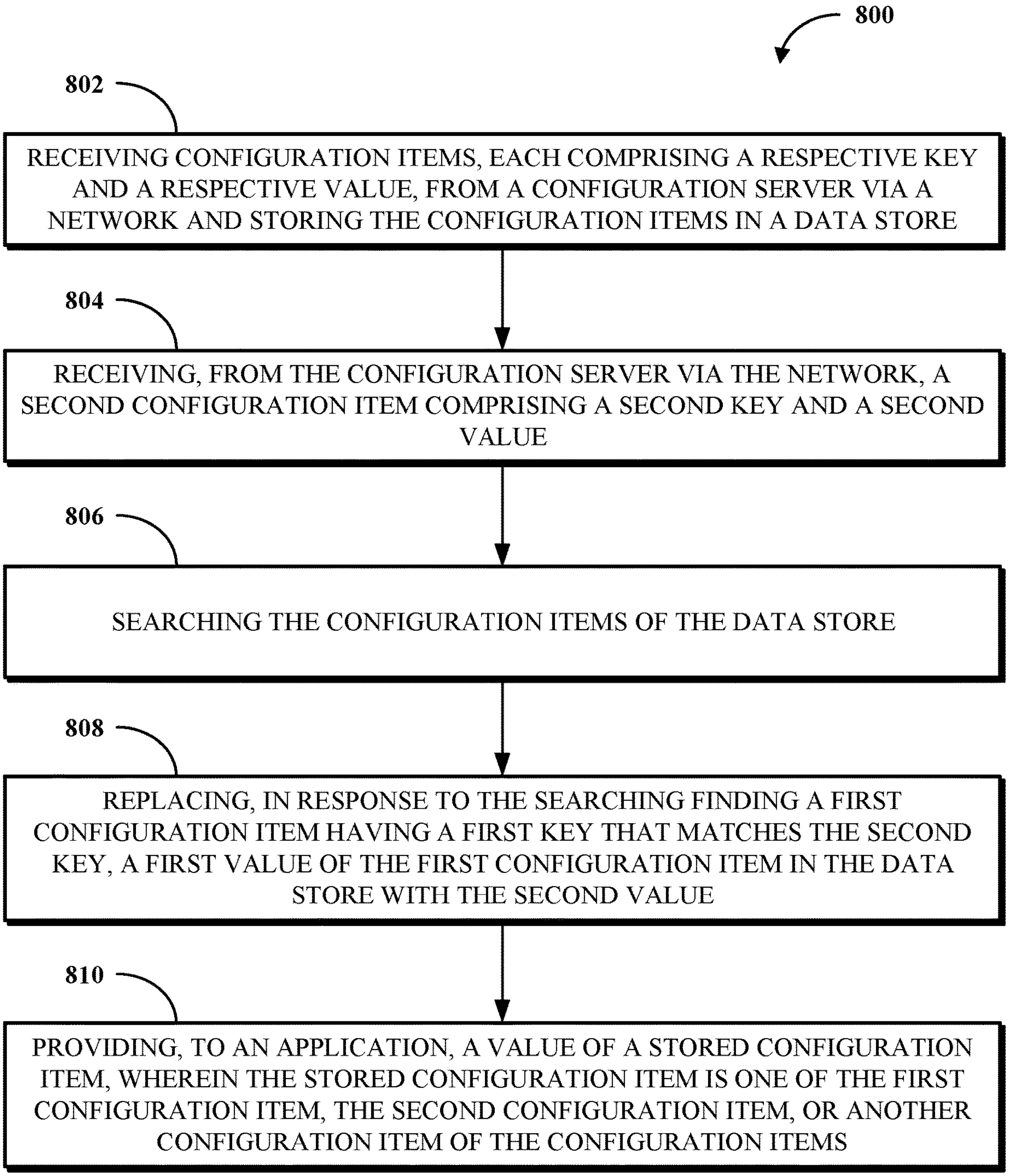
FIG. 8 is a flowchart of an example of a technique for dynamic configuration management.

To further describe some implementations in greater detail, reference is next made to examples of techniques which may be performed by or using a system for dynamic configuration management. FIG. 8 is a flowchart of an example of a technique 800 for dynamic configuration management. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter. The technique 800 may be performed by one or more components of a data center, for example, the datacenter 506 of FIG. 5 or the datacenter 606 of FIG. 6.

The step 802 comprises receiving configuration items, each comprising a respective key and a respective value, from a configuration server via a network and storing the configuration items in a data store. The configuration items may be received from the configuration server 522 of FIG. 5 via the network interface 520, of the datacenter 506, connected to the network 514. The configuration items may be stored in a memory, such as the memory 610 of the datacenter 606 of FIG. 6. In some implementations, the received configuration items may comprise the full configuration file 632 of FIG. 6, which may be stored as the full configuration file 642. In other implementations, the received configuration items may comprise the partial configuration file 634, which may be stored as the partial configuration file 644. In some implementations, the configuration server may be a Nacos server.

The step 804 comprises receiving, from the configuration server via the network, a second configuration item comprising a second key and a second value. The second configuration item may be received via a network interface, such as the network interface 520 of FIG. 5, connected to the network 514 of FIG. 5. In some implementations, the received second configuration item may comprise the partial configuration file 634 of FIG. 6.

The step 806 comprises searching the configuration items of the data store. The searching may be accomplished by implementation of a suitable search algorithm, including linear search, binary search, and so on, implemented by software, firmware, and/or hardware executed by a component of the datacenter, for example the application server 508 of the datacenter 506 of FIG. 5. In the case of a searching algorithm or combination of searching algorithms that require a presorted list for searching, the configuration items received in step 802 may be sorted according to the respective values in one or more fields of the configuration items, for example, sorted by their respective keys, or sorted by their respective timestamps, prior to storage of the configuration items. In contrast, the configurations items received in step 802 may be sorted in step 806 just prior to searching. Sorting according to keys may, for example, correspond to an alphabetical or alpha-numerical order. Sorting according to timestamps may, for example, correspond to a chronological order.

The step 808 comprises replacing, in response to the searching finding a first configuration item having a first key that matches the second key, a first value of the first configuration item in the data store with the second value. The configuration items in the data store may be the configuration items stored in the configuration memory 610 of the datacenter 606 of FIG. 6.

The step 810 comprises providing, to an application, a value of a stored configuration item, wherein the stored configuration item is one of the first configuration item, the second configuration item, or another configuration item of the configuration items. The application may be an instance of the conferencing software 608 executing on the datacenter 606 of FIG. 6.

Figure 9:
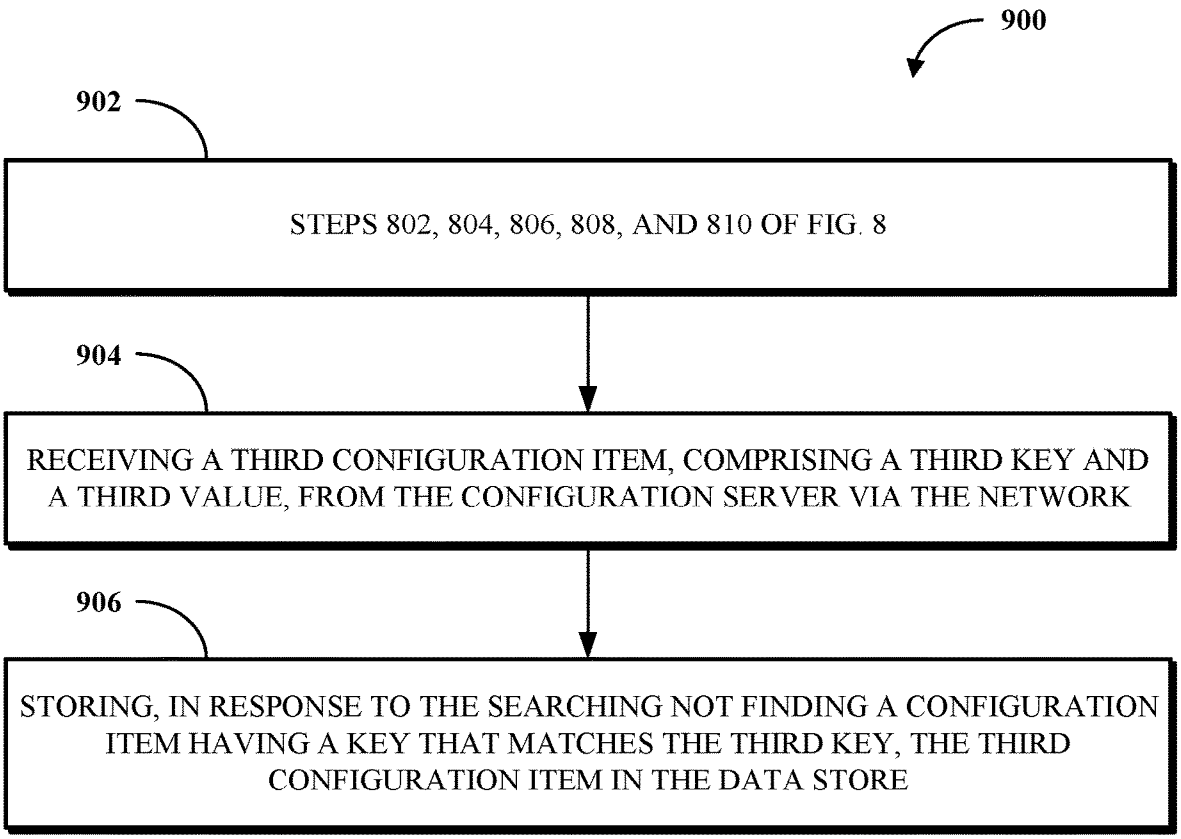
FIG. 9 is a flowchart of an example of a further technique for dynamic configuration management.

FIG. 9 shows a technique 900 comprising the steps shown in FIG. 8 and additional steps that may be performed in some implementations. The steps or operations of the technique 900 in accordance with this disclosure can occur in various orders and/or concurrently, e.g., the additional steps in FIG. 9 need not follow the steps 802, 804, 806, 808, and 810 of FIG. 8 as suggested by FIG. 9. Specifically, in some implementations, the steps 904 and 906 may follow the step 802 and precede the steps 804, 806, 808, and 810. The technique 900 may be performed by one or more components of a data center, for example, the datacenter 506 of FIG. 5 or the datacenter 606 of FIG. 6.

The step 902 comprises the steps 802, 804, 806, 808, and 810 of FIG. 8.

The step 904 comprises receiving a third configuration item, comprising a third key and a third value, from the configuration server via the network. The third configuration item may be received via a network interface, such as the network interface 520 of FIG. 5, connected to the network 514 of FIG. 5. In some implementations, the received third configuration item may comprise the partial configuration file 634 of FIG. 6. The configuration server and the network may be, for example, the configuration server 522 of FIG. 5 or the configuration server 622 of FIG. 6, and the network may be, for example, the network 514 of FIG. 5.

The step 906 comprises storing, in response to the searching not finding a configuration item having a key that matches the third key, the third configuration item in the data store. The search of the first configuration item may be accomplished by implementation of a suitable search algorithm, including linear search, binary search, and so on, implemented by software, firmware, and/or hardware executed by a component of the datacenter, for example the application server 508 of the datacenter 506 of FIG. 5. The third configuration item may be stored in a memory, such as the memory 610 of the datacenter 606 of FIG. 6.

In an example implementation at a data center, a method comprises: receiving configuration items, each comprising a respective key and a respective value, from a configuration server via a network and storing the configuration items in a data store; receiving, from the configuration server via the network, a second configuration item comprising a second key and a second value; searching the configuration items of the data store; replacing, in response to the searching finding a first configuration item having a first key that matches the second key, a first value of the first configuration item in the data store with the second value; and providing, to an application, a value of a stored configuration item, wherein the stored configuration item is one of the first configuration item, the second configuration item, or another configuration item of the configuration items.

In some implementations, the method further comprises: receiving a third configuration item, comprising a third key and a third value, from the configuration server via the network; and storing, in response to the searching not finding a configuration item having a key that matches the third key, the third configuration item in the data store.

In some implementations, the configuration server is a Nacos configuration server.

In some implementations, the application is a cloud-native application comprising conferencing software that enables audio and/or video conferences between multiple participants.

In some implementations, the method further comprises sending a request to the configuration server to send the second configuration item, wherein the second configuration item is new, updated, or deleted with respect to the configuration items.

In some implementations, the method further comprises modifying, in response to the first key matching the second key, at least one of: a timestamp field of the first configuration item according to a timestamp associated with the second configuration item; an action field of the first configuration item according to a most recent action associated with the second configuration item; an operator field of the first configuration item according to an operator associated with the second configuration item; or a comment field of the first configuration item according to a comment associated with the second configuration item.

In some implementations, the configuration items are in a compressed data format when received; and the compressed data format comprises compression of each respective value and no compression of each respective key.

In some implementations, the method further comprises receiving, from a listener for the application having been configured to detect changes in the value of the stored configuration item, a request to provide the value of the stored configuration item to the application.

In another example implementation at a data center, a non-transitory computer-readable medium stores instructions operable to cause one or more processors to perform operations comprising: receiving configuration items, each comprising a respective key and a respective value, from a configuration server via a network and storing the configuration items in a data store; receiving, from the configuration server via the network, a second configuration item, comprising a second key and a second value; searching the configuration items of the data store; replacing, in response to the searching finding a first configuration item having a first key that matches the second key, a first value of the first configuration item in the data store with the second value; and providing, to an application, a value of a stored configuration item, wherein the stored configuration item is one of the first configuration item, the second configuration item, or another configuration item of the configuration items.

In some implementations, the operations further comprise: receiving a third configuration item, comprising a third key and a third value, from the configuration server via the network; and storing, in response to the searching not finding a configuration item having a key that matches the third key, the third configuration item in the data store.

In some implementations, the configuration server is a Nacos configuration server, and the application is a cloud-native application comprising conferencing software that enables audio and/or video conferences between multiple participants.

In some implementations, at least one of the configuration items or the second configuration item are in a compressed data format when received.

In some implementations, the storing of the second configuration item in the data store comprises storing data in at least one of: a timestamp field of the second configuration item; an action field of the second configuration item; an operator field of the second configuration item; or a comment field of the second configuration item.

In some implementations, the operations further comprise receiving, from a listener for the application having been configured to detect changes in the value of the stored configuration item, a request to provide the value of the stored configuration item to the application.

In another example implementation at a data center, a system comprises: one or more memories and one or more processors configured to execute instructions stored in the one or more memories to: receive configuration items, each comprising a respective key and a respective value, from a configuration server via a network and store the configuration items in a data store; receive, from the configuration server via the network, a second configuration item, comprising a second key and a second value; search the configuration items of the data store; replace, in response to the search finding a first configuration item having a first key that matches the second key, a first value of the first configuration item in the data store with the second value; and provide, to an application, a value of a stored configuration item, wherein the stored configuration item is one of the first configuration item, the second configuration item, or another configuration item of the configuration items.

In some implementations, the instructions include instructions to: receive a third configuration item, comprising a third key and a third value, from the configuration server via the network; and store, in response to the searching not finding a configuration item having a key that matches the third key, the third configuration item in the data store.

In some implementations, the instructions include instructions to maintain a change log that records the second key and a timestamp associated with the second configuration item.

In some implementations, the instructions include instructions to sort the configuration items according to their respective keys, wherein the configuration items stored in the data store are sorted according to their respective keys.

In some implementations, the second value is one of a blacklist or a whitelist.

In some implementations, the instructions include instructions to configure a listener for the application to detect changes in the value of the stored configuration item.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving a master configuration file comprising a plurality of configuration items from a configuration server via a network and storing the plurality of configuration items in a data store, each configuration item of the plurality of configuration items comprising a respective key and a respective value;

receiving a partial configuration file comprising a second plurality of configuration items that is fewer than the plurality of configuration items from the configuration server via the network, a second configuration item of the second plurality of configuration items comprising a second key and a second value;

searching the plurality of configuration items of the data store by comparing the second key to the respective keys of the plurality of configuration items;

replacing, in response to the searching finding a first configuration item having a first key that matches the second key, a first value of the first configuration item in the data store with the second value; and providing, to an application, a value of a stored configuration item, wherein the stored configuration item is one of the first configuration item, the second configuration item, or another configuration item of the configuration items.

2. The method of claim 1, further comprising:

receiving a third configuration item, comprising a third key and a third value, from the configuration server via the network; and storing, in response to the searching not finding a configuration item having a key that matches the third key, the third configuration item in the data store.

3. The method of claim 1, wherein:

the configuration server is a Dynamic Naming and Configuration Service (Nacos) configuration server.

4. The method of claim 1, wherein:

the application is a cloud-native application comprising conferencing software that enables audio and/or video conferences between multiple participants.

5. The method of claim 1, further comprising:

sending a request to the configuration server to send the second configuration item, wherein the second configuration item is new, updated, or deleted with respect to the plurality of configuration items.

6. The method of claim 1, further comprising:

modifying, in response to the first key matching the second key, at least one of:

a timestamp field of the first configuration item according to a timestamp associated with the second configuration item;

an action field of the first configuration item according to a most recent action associated with the second configuration item;

an operator field of the first configuration item according to an operator associated with the second configuration item; or a comment field of the first configuration item according to a comment associated with the second configuration item.

7. The method of claim 1, wherein:

the plurality of configuration items are in a compressed data format when received; and the compressed data format comprises compression of each respective value and no compression of each respective key.

8. The method of claim 1, further comprising:

receiving, from a listener for the application having been configured to detect changes in the value of the stored configuration item, a request to provide the value of the stored configuration item to the application.

9. A non-transitory computer-readable medium storing instructions operable to cause one or more processors to perform operations comprising:

receiving a master configuration file comprising a plurality of configuration items from a configuration server via a network and storing the plurality of configuration items in a data store, each configuration item of the plurality of configuration items comprising a respective key and a respective value;

receiving a partial configuration file comprising a second plurality of configuration items that is fewer than the plurality of configuration items; from the configuration server via the network, a second configuration item of the second plurality of configuration items comprising a second key and a second value;

searching the plurality of configuration items of the data store by comparing the second key to the respective keys of the plurality of configuration items;

replacing, in response to the searching finding a first configuration item having a first key that matches the second key, a first value of the first configuration item in the data store with the second value; and providing, to an application, a value of a stored configuration item, wherein the stored configuration item is one of the first configuration item, the second configuration item, or another configuration item of the configuration items.

10. The medium of claim 9, the operations further comprising:

receiving a third configuration item, comprising a third key and a third value, from the configuration server via the network; and storing, in response to the searching not finding a configuration item having a key that matches the third key, the third configuration item in the data store.

11. The medium of claim 9, wherein:

the configuration server is a Dynamic Naming and Configuration Service (Nacos) configuration server; and the application is a cloud-native application comprising conferencing software that enables audio and/or video conferences between multiple participants.

12. The medium of claim 9, wherein:

at least one configuration item of the plurality of configuration items or the second configuration item are in a compressed data format when received.

13. The medium of claim 9, wherein the storing of the second configuration item in the data store comprises storing data in at least one of:

a timestamp field of the second configuration item;

an action field of the second configuration item;

an operator field of the second configuration item; or a comment field of the second configuration item.

14. The medium of claim 9, the operations further comprising:

receiving, from a listener for the application having been configured to detect changes in the value of the stored configuration item, a request to provide the value of the stored configuration item to the application.

15. A system, comprising:

one or more memories; and one or more processors configured to execute instructions stored in the one or more memories to:

receive a master configuration file comprising a plurality of configuration items from a configuration server via a network and store the plurality of configuration items in a data store, each configuration item of the plurality of configuration items comprising a respective key and a respective value;

receive a partial configuration file comprising a second plurality of configuration items that is fewer than the plurality of configuration items; from the configuration server via the network, a second configuration item of the second plurality of configuration items; comprising a second key and a second value;

search the configuration items of the data store by comparing the second key to the respective keys of the plurality of configuration items;

replace, in response to the search finding a first configuration item having a first key that matches the second key, a first value of the first configuration item in the data store with the second value; and provide, to an application, a value of a stored configuration item, wherein the stored configuration item is one of the first configuration item, the second configuration item, or another configuration item of the configuration items.

16. The system of claim 15, wherein the instructions include instructions to:

receive a third configuration item, comprising a third key and a third value, from the configuration server via the network; and store, in response to the searching not finding a configuration item having a key that matches the third key, the third configuration item in the data store.

17. The system of claim 15, wherein the instructions include instructions to:

maintain a change log that records the second key and a timestamp associated with the second configuration item.

18. The system of claim 15, wherein the instructions include instructions to:

sort the plurality of configuration items according to their respective keys; wherein the plurality of configuration items stored in the data store are sorted according to their respective keys.

19. The system of claim 15, wherein:

the second value is one of a blacklist or a whitelist.

20. The system of claim 15, wherein the instructions include instructions to:

configure a listener for the application to detect changes in the value of the stored configuration item.

* * * * *